United States Patent
Chaudhry et al.

(10) Patent No.: US 11,408,616 B2
(45) Date of Patent: Aug. 9, 2022

(54) WATER HEATERS WITH REAL-TIME HOT WATER SUPPLY DETERMINATION

(71) Applicant: Rheem Manufacturing Company, Atlanta, GA (US)

(72) Inventors: Raheel A. Chaudhry, Montgomery, AL (US); Lydia Herge, Mathews, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 32 days.

(21) Appl. No.: 16/901,083

(22) Filed: Jun. 15, 2020

(65) Prior Publication Data

US 2020/0309388 A1 Oct. 1, 2020

Related U.S. Application Data

(63) Continuation of application No. 15/653,933, filed on Jul. 19, 2017, now Pat. No. 10,684,023.

(51) Int. Cl.
| | |
|---|---|
| *F24H 1/00* | (2022.01) |
| *F24D 19/10* | (2006.01) |
| *G05D 23/19* | (2006.01) |
| *G05B 15/02* | (2006.01) |
| *F24H 9/20* | (2022.01) |
| *F24H 1/20* | (2022.01) |
| *G05D 23/00* | (2006.01) |
| *F24D 19/00* | (2006.01) |
| *G05B 15/00* | (2006.01) |

(52) U.S. Cl.
CPC ......... *F24D 19/1051* (2013.01); *F24H 1/202* (2013.01); *F24H 9/2021* (2013.01); *G05B 15/02* (2013.01); *G05D 23/1917* (2013.01); *F24D 19/00* (2013.01); *F24D 2200/08* (2013.01); *F24D 2220/08* (2013.01); *G05B 15/00* (2013.01); *G05D 23/00* (2013.01)

(58) Field of Classification Search
None
See application file for complete search history.

(56) References Cited

U.S. PATENT DOCUMENTS

| 7,712,677 | B1 | 5/2010 | Munsterhuis et al. |
|---|---|---|---|
| 9,390,381 | B2 | 7/2016 | Davari et al. |
| 10,684,023 | B2 * | 6/2020 | Chaudhry .............. G05B 15/02 |
| 2006/0257127 | A1 | 11/2006 | Patterson et al. |
| 2007/0175883 | A1 | 3/2007 | Miu et al. |
| 2010/0004790 | A1 | 1/2010 | Harbin, III et al. |
| 2012/0054123 | A1 | 3/2012 | Broniak et al. |
| 2012/0060771 | A1 | 3/2012 | Brian et al. |

(Continued)

*Primary Examiner* — Paul B Yanchus, III
(74) *Attorney, Agent, or Firm* — Eversheds Sutherland (US) LLP

(57) ABSTRACT

A water heating system can include a water heater having a tank, an inlet line, and an outlet line, where the inlet line provides unheated water to the tank, and where the outlet line draws heated water from the tank. The water heating system can also include multiple sensing devices, where each sensing device of the plurality of sensing devices measures a parameter associated with the tank. The water heating system can further include a controller communicably coupled to the plurality of sensing devices, where the controller determines an amount of heated water in the tank based on measurements made by the plurality of sensing devices.

20 Claims, 8 Drawing Sheets

FIG. 5

(56) References Cited

U.S. PATENT DOCUMENTS

2015/0226460 A1    8/2015    Zemach
2017/0003052 A1*  1/2017    Watts ................... F24H 9/2007
2017/0284703 A1   10/2017   Weksler et al.

* cited by examiner

WATER HEATERS WITH REAL-TIME HOT WATER SUPPLY DETERMINATION

CROSS-REFERENCE TO RELATED APPLICATIONS

This application claims priority to U.S. application Ser. No. 15/653,933, filed on 19 Jul. 2017, the disclosure of which is herein incorporated by reference in its entirety.

TECHNICAL FIELD

The present disclosure relates generally to water heaters, and more particularly to systems, methods, and devices for determining, in real time, hot water supply in a storage-type water heater.

BACKGROUND

Water heaters are generally used to provide a supply of hot water. Water heaters can be used in a number of different residential, commercial, and industrial applications. A water heater can supply hot water to a number of different processes. For example, a hot water heater in a residential dwelling can be used for an automatic clothes washer, an automatic dishwasher, one or more showers, and one or more sink faucets. Every storage-type water heater has a limited capacity, and so when one or more processes use hot water at one time, there may be limited or no hot water available from the storage-type water heater until the water heater has sufficient time to heat more water.

SUMMARY

In general, in one aspect, the disclosure relates to a water heating system. The water heating system can include a water heater that includes a tank, an inlet line, and an outlet line, where the inlet line provides unheated water to the tank, and where the outlet line draws heated water from the tank. The water heating system can also include multiple sensing devices, where each sensing device measures at least one parameter associated with the tank. The water heating system can further include a controller communicably coupled to the sensing devices, where the controller determines an amount of heated water in the tank based on measurements made by the sensing devices.

In another aspect, the disclosure can generally relate to a controller. The controller can include a control engine that is configured to communicate with multiple sensor devices to receive multiple measurements associated with heated water within a tank of a water heater. The control engine can also be configured to determine, using the measurements, how much heated water is currently available within the tank of the water heater.

In yet another aspect, the disclosure can generally relate to a non-transitory computer-readable medium that includes instructions that, when executed by a hardware processor, perform a method for determining a supply of heated water from a water heater in real-time. The method can include measuring at least one first temperature of a fluid within a tank of the water heater, where the fluid comprises heated water. The method can also include determining, using at least one algorithm and the at least one first temperature, an amount of heated water available for immediate use from the water heater.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
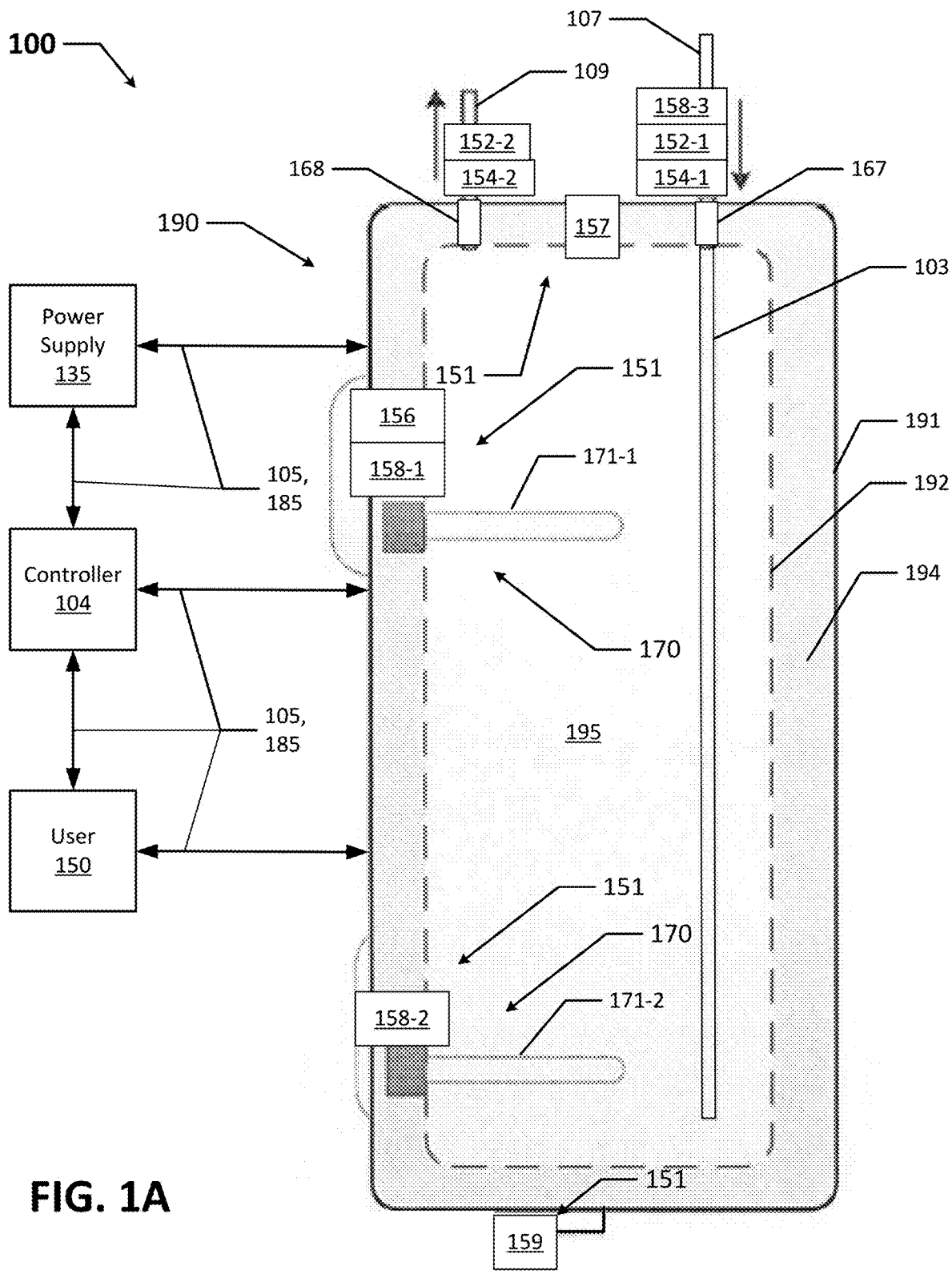
FIGS. 1A and 1B show diagrams of a system that includes a water heater and a controller in accordance with certain example embodiments.

In general, example embodiments provide systems, methods, and devices for determining the supply of hot water (also called heated water herein) in a storage-type water heater. Example embodiments can be used for any size (e.g., capacity) of water heater. Further, example embodiments can be located in any type of environment (e.g., warehouse, attic, garage, storage, mechanical room, basement) for any type (e.g., commercial, residential, industrial) of user. Water heaters used with example embodiments can be used for one or more of any number of processes (e.g., automatic clothes washers, automatic dishwashers, showers, sink faucets, heating systems, humidifiers).

Example embodiments can make a number of determinations with respect to hot water available from a hot water heater. For instance, example embodiments can determine how much hot water is currently in the tank of a hot water heater. As another example, embodiments can provide the temperature of the hot water that is currently available in the tank of the hot water heater. As yet another example, if the tank of a hot water heater is out of hot water, or if the tank of a water heater does not have enough hot water for a current use, example embodiments can estimate how long it will take for the water heater to generate a certain amount of hot water.

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Storage-type water heaters described herein have a rated capacity (also sometimes called a nameplate capacity) and an actual capacity. These capacities are with respect to the tank of the water heater, as described below. In many cases, the actual capacity is less than the rated capacity. For example, a storage-type electric water heater with a rated capacity of 50 gallons can have an actual capacity of 37.5 gallons. The difference between the actual and rated capacity of a water heater can vary based on one or more of a number of factors. For example, for an electric water heater, the actual capacity can be 75% of the nameplate capacity. Example embodiments described herein are directed to the actual capacity of the tank of the storage-type water heater, regardless of whether the water heater uses electricity, gas, or any other form of energy. The actual capacity is the amount of hot water that a tank can hold. The actual capacity can vary based on one or more of a number of factors, including but not limited to the configuration of heating elements, the energy source (e.g., electricity, natural gas) used for the heating system, and the construction of the tank.

In the foregoing figures showing example embodiments of water heaters with real-time hot water supply determination, one or more of the components shown may be omitted, repeated, and/or substituted. Accordingly, example embodiments of water heaters with real-time hot water supply determination should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three digit number, and corresponding components in other figures have the identical last two digits.

In some cases, example embodiments can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein meet (and/or allow a corresponding water heater system or portion thereof to meet) such standards when required.

Example embodiments of water heaters with real-time hot water supply determination will be described more fully hereinafter with reference to the accompanying drawings, in which example embodiments of water heaters with real-time hot water supply determination are shown. Water heaters with real-time hot water supply determination may, however, be embodied in many different forms and should not be construed as limited to the example embodiments set forth herein. Rather, these example embodiments are provided so that this disclosure will be thorough and complete, and will fully convey the scope of water heaters with real-time hot water supply determination to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of water heaters with real-time hot water supply determination. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
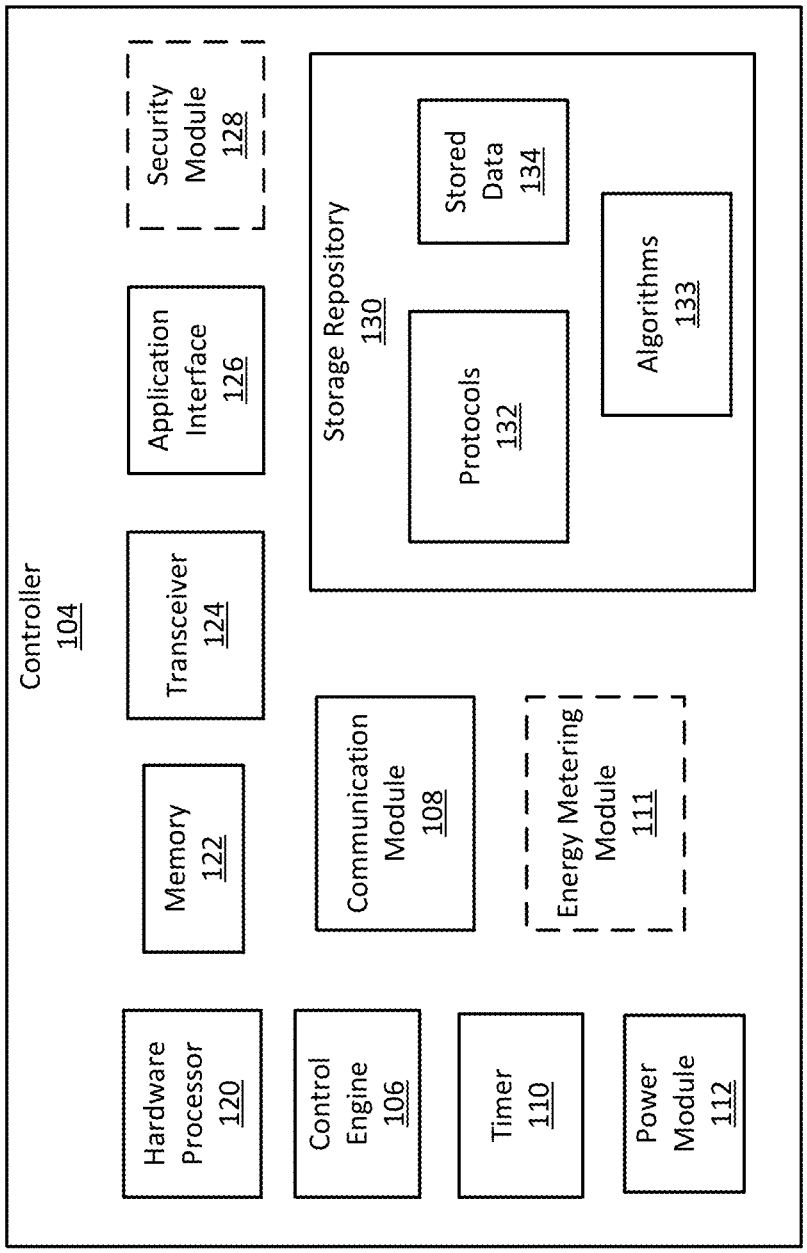

FIGS. 1A and 1B show diagrams of a water heating system 100 that includes a water heater 190 that is controlled by a controller 104 in accordance with certain example embodiments. Specifically, FIG. 1A shows the water heating system 100, and FIG. 1B shows a detailed system diagram of the controller 104. As shown in FIGS. 1A and 1B, the water heating system 100 can include the water heater 190, the controller 104, an inlet line 107, an outlet line 109, sensors 151, a power supply 135, and a user 150. The water heater 190 is shown in a cross-sectional side view in FIG. 1A and can include one or more sensor devices 151 (also sometimes called sensor modules or sensors), a dip tube 103, an inlet fitting 167, an outlet fitting 168, a tank 195, and a heating system 170.

As shown in FIG. 1B, the controller 104 can include one or more of a number of components. Such components, can include, but are not limited to, a control engine 106, a communication module 108, a timer 110, an optional energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system. Further, one or more components shown in FIGS. 1A and 1B can be rearranged. For example, some or all of the inlet line 107 can be part of the water heater 190. Any component of the example water heating system 100 can be discrete or combined with one or more other components of the water heating system 100.

A user 150 may be any person or entity that interacts with the water heater 190 and/or the controller 104. Examples of a user 150 may include, but are not limited to, an engineer, an appliance or process that uses heated water, an electrician, an instrumentation and controls technician, a mechanic, an operator, a consultant, an electric utility, a grid operator, a retail electric provider, an energy marketing company, load forecasting software, a weather forecasting service, a network manager, a labor scheduling system, a contractor, a homeowner, a landlord, a building management company, and a manufacturer's representative. There can be one or multiple users 150.

The user 150 can use a user system (not shown), which may include a display (e.g., a GUI). The user 150 can interact with (e.g., sends data to, receives data from) the controller 104 via the application interface 126 (described below). The user 150 can also interact with the water heater 190 (including any components thereof, including one or more of the sensor devices 151) and/or the power supply 135. Interaction between the user 150, the controller 104, the water heater 190, and the power supply 135 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, WirelessHART, ISA100) technology. For example, a signal transfer link 105 can be (or include) one or more electrical conductors that are coupled to the controller 104 and to a sensor device 151 of the water heater 190. A signal transfer link 105 can transmit signals (e.g., communication signals, control signals, data) between the controller 104, the user 150, the water heater 190 (including components thereof), and/or the power supply 135.

Similarly, a power transfer link 185 can transmit power between the controller 104, the user 150, the water heater 190 (including components thereof), and/or the power supply 135. One or more signal transfer links 105 and/or one or more power transfer links 185 can also transmit signals and power, respectively, between components (e.g., temperature sensor 158-2, flow sensor 154-1) within the water heater 190 and/or within the controller 104.

The power supply 135 provides power, directly or indirectly, to one or more components (e.g., the sensor devices 151, the controller 104, the heating system 170) of the water heating system 100. The power supply 135 can include one or more components (e.g., a transformer, a fuse) that receives power (for example, through an electrical cable) from an independent power source external to the heating system 100 and generates power of a type (e.g., AC, DC) and level (e.g., 240V, 120V) that can be used by one or more components of the heating system 100. For example, the power supply 135 can provide 240V AC power. In addition, or in the alternative, the power supply 135 can be a source of power in itself. For example, the power supply 135 can be or include a battery, a localized photovoltaic power system, or some other source of independent power. In certain example embodiments, the power supply 135 delivers 240 VAC.

As stated above, the water heater 190 in this example includes multiple sensor devices 151, a dip tube 103, an inlet fitting 167, an outlet fitting 168, a tank 195, and a heating system 170. The water heater 190 has an outer wall 191 and an inner wall 192, where the inner wall 192 forms the tank 195. Disposed between the outer wall 191 and the inner wall 192 can be disposed insulation 194 to help the tank 195 to retain heat longer. The inlet fitting 167 can be disposed within the insulation 194 and couple to the inlet line 107 at its top end and to the dip tube 103 at its bottom end. The outlet fitting 168 can also be disposed within the insulation 194 and couple to the outlet line 109 at its top end. In this example, both the inlet fitting 167 and the outlet fitting 168 are disposed at the top end of the water heater 190.

The inlet line 107 can be a pipe or other vessel that delivers unheated water to the tank 195 of the water heater 190. The distal end of the inlet line 107 is coupled, directly or indirectly, to the top end of the inlet fitting 167. The bottom end of the inlet fitting is coupled to the proximal end of the dip tube 103, which is disposed entirely within the water heater 190. The dip tube 103 can allow for the flow of unheated water into the tank 195 of the water heater 190. The dip tube 103 has a distal end that can be disposed at any point within the tank 195. Typically, as in this case, the distal end of the dip tube 103 is disposed near the bottom end of the tank 195. The top end of the outer wall 191 and the inner wall 192 of the water heater 190 have an aperture in which the inlet fitting 167 can be disposed therein. This configuration allows unheated water to flow from an external source into the tank 195 of the water heater 190.

Similarly, the outlet line 109 can be a pipe or other vessel that can allow for the heated water in the tank 195 to flow out of the water heater 190. The outlet line 109 has a distal end that can be disposed at any point within the tank 195. Typically, as in this case, the distal end of the outlet line 109 is disposed near the top end of the tank 195. The top end of the outer wall 191 and the inner wall 192 of the water heater 190 have an aperture in which the outlet fitting 168 can be disposed. A segment of the outlet line 109 can be coupled to the bottom end of the outlet fitting 168, allowing that segment of the outlet line 109 to extend into the tank 195. The remainder of the outlet line 109 is coupled to the top end of the outlet fitting 168. This configuration allows heated water in the tank 195 to be drawn from the tank 195 of the water heater 190 so that the heated water can be delivered to one or more of a number of devices (e.g., clothes washer, dishwasher, faucets, shower heads) that use the heated water.

Each of the sensor devices 151 can measure one or more of a number of parameters. Examples of types of sensors 151 can include, but are not limited to, temperature sensor, a pressure sensor, a flow rate sensor, a scale, a voltmeter, an ammeter, a power meter, an ohmmeter, an electric power meter, and a resistance temperature detector. A sensor 151 can also include one or more components and/or devices (e.g., a potential transformer, a current transformer, electrical wiring) related to the measurement of a parameter.

A parameter that can be measured by a sensor 151 can include, but is not limited to, pressure, flow rate, current, voltage, power, resistance, weight, and temperature. In certain example embodiments, the parameter or parameters measured by a sensor 151 can be used by the controller 104 to determine an amount of heated water that is currently available within the tank 195 of the water heater 190 and/or how long it will take for an amount of heated water within the tank 195 of the water heater 190 to become available. Each sensor 151 can use one or more of a number of communication protocols. A sensor 151 can be a stand-alone device or integrated with another component (e.g., the heating system 170) in the system 100. A sensor 151 can measure a parameter continuously, periodically, based on the occurrence of an event, based on a command received from the control module 106 of the controller 104, and/or based on some other factor.

In this example, there are three temperature sensors 158, at least one flow sensor 154, and a water leak sensor 159. The water leak sensor 159 is disposed toward the bottom end of the water heater 190 and detects a leak in the tank 195 of the water heater 190. The flow sensor 154 measures the rate of flow of unheated water in the inlet line 107 when entering the tank 195. Temperature sensor 158-1 is located toward the top end (e.g., approximately ¼ the height of the tank 195 from the top end of the tank 195) and measures the temperature of the water (e.g., heated water, unheated water, mixture of heated water and unheated water) in the tank 195 at that point. This temperature measured by temperature sensor 158-1 can be an indication of the maximum temperature of the heated water in the tank 195, although, since heat rises, the temperature of the heated water in the tank 195 above the temperature sensor 158-1 is same or higher than the temperature measured by the temperature sensor 158-1.

Temperature sensor 158-2 is located toward the bottom end (e.g., approximately ¼ the height of the tank 195 from the bottom end of the tank 195) and measures the temperature of the water (e.g., heated water, unheated water, mixture of heated water and unheated water) in the tank 195 at that point. Since heat rises, the temperature measured by temperature sensor 158-2 can be no greater than the temperature measured by the temperature sensor 158-1. If this event occurs, the controller 104 can determine that temperature sensor 158-1 and/or temperature sensor 158-2 are faulty and require maintenance and/or replacement. Temperature sensor 158-3 measures the temperature of the unheated water in the inlet line 107 before the unheated water flows into the tank 195. The controller 104 uses the measurements made by some or all of these sensors 151 to determine such things as the amount of heated water available in the tank 195 for immediate use and how long it will take for a certain amount of heated water to become available in the tank 195.

The water heater 190 can also include one or more valves 152. In this example, the water heater 190 includes a valve 152-1 that controls the rate of flow (or the flow itself) of the unheated water in the inlet tube 107, as well as an optional valve 152-2 that controls the rate of flow (or the flow itself) of heater water in the outlet tube 109. In certain example embodiments, the position (e.g., fully open, fully closed, 30% open) of a valve 152 can be controlled by the controller 104. The water heater 190 can further include a switch 156 (also called an emergency cutout switch 156 or an ECO 156) that controls the energy (e.g., electrical power, gas) delivered to the heating system 170. The switch 156 can have an open position (preventing energy from flowing to the heating system 170) and a closed position (allowing energy to flow to the heating system 170). The position and operation of the switch 156 is independent of the controller 104.

The water heater 190 can also include a temperature and pressure relief valve 157 that is disposed in the top of the tank 195, the top of the outer wall 191, and the insulation disposed therebetween. The relief valve 157 can be a purely mechanical device (e.g., not controlled by the controller 104) that detects when the pressure and/or temperature within the tank 195 exceeds a threshold value for that parameter. If such an event were to occur, the relief valve 157 would operate from a normally-closed position to an open position.

If the relief valve 157 determines that the pressure within the tank 195 exceeds a maximum threshold value, then the relief valve 157 opens to allow the excess pressure to vent out the top of the water heater 190 into the ambient environment. When the pressure within the tank 195 measured by the relief valve 157 falls back within a safe range (another threshold value), then the relief valve 157 returns to the closed position. Similarly, if the relief valve 157 determines that the temperature within the tank 195 exceeds a maximum threshold value, then the relief valve 157 opens to allow the excess temperature to vent out the top of the water heater 190 into the ambient environment. When the temperature within the tank 195 measured by the relief valve 157 falls back within a safe range (another threshold value), then the relief valve 157 returns to the closed position.

The heating system 170 of the water heater 190 can include one or more devices (or components thereof) that consume energy (e.g., electricity, natural gas, propane) during operation. An example of such a device or component of the heating system 170 can include the heating elements 171 shown in FIG. 1A. In this case, there are two heating elements 171 that extend toward the center of the tank 195. Heating element 171-1 is located toward the top of the tank 195, approximately ⅓ the height of the tank 195 from the top end of the tank 195. Heating element 171-2 is located toward the bottom of the tank 195, approximately ⅙ the height of the tank 195 from the bottom end of the tank 195.

Those of ordinary skill in the art will appreciate that heating systems 170 for water heaters 190 can have any of a number of other configurations. In any case, the controller 104 is aware of the devices, components, ratings, positioning, and any other relevant information regarding the heating system 170 relative to the tank 195. In some cases, one or more devices of the heating system 170 can have its own local controller. In such a case, the controller 104 can communicate with the local controller of the heating system 170 using signal transfer links 105 and/or power transfer links 185.

The user 150, the power supply 135, and/or the water heater 190 (including the sensors 151 and a local controller, if any) can interact with the controller 104 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the power supply 135, and/or the water heater 190. The user 150, the power supply 135, and the water heater 190 (including portions thereof) can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 2 below, the controller 104 can include a user interface having one or more of a number of I/O devices 216 (e.g., buzzer, alarm, indicating light, pushbutton).

The controller 104, the user 150, the power supply 135, and/or the water heater 190 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with Local Area Network (LAN), Wide Area Network (WAN), Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the water heating system 100.

The controller 104 can be a stand-alone device or integrated with another component (e.g., the water heater 190) in the water heating system 100. When the controller 104 is a stand-alone device, the controller 104 can include a housing. In such a case, the housing can include at least one wall that forms a cavity. In some cases, the housing can be designed to comply with any applicable standards so that the controller 104 can be located in a particular environment (e.g., a hazardous environment, a high temperature environment, a high humidity environment).

The housing of the controller 104 can be used to house one or more components of the controller 104. For example, the controller 104 (which in this case includes the control engine 106, the communication module 108, the timer 110, the optional energy metering module 111, the power module 112, the storage repository 130, the hardware processor 120, the memory 122, the transceiver 124, the application interface 126, and the optional security module 128) can be disposed in a cavity formed by a housing. In alternative embodiments, any one or more of these or other components of the controller 104 can be disposed on a housing and/or remotely from a housing.

The storage repository 130 can be a persistent storage device (or set of devices) that stores software and data used to assist the controller 104 in communicating with the user 150, the power supply 135, and water heater 190 (including components thereof) within the heating system 100. In one or more example embodiments, the storage repository 130 stores one or more protocols 132, algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols 132 that are used to send and/or receive data between the controller 104 and the user 150, the power supply 135, and the water heater 190.

A protocol 132 can be used for wired and/or wireless communication. Examples of a protocol 132 can include, but are not limited to, Econet, Modbus, profibus, Ethernet, and fiberoptic. One or more of the communication protocols 132 can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols 132 can provide a layer of security to the data transferred within the system 100.

The algorithms 133 can be any formulas, logic steps, mathematical models (e.g., load forecasting models, forward energy price model), and/or other suitable means of manipulating and/or processing data. One or more algorithms 133 can be used for a particular protocol 132. As discussed above, the controller 104 uses information (e.g., temperature measurements, flow rate measurements) provided by the sensor devices 151 to generate, using one or more protocols 132 and/or one or more algorithms 133, information related to the availability of heated water in the tank 195 of the water heater 190 to a user 150.

For example, a protocol 132 and/or an algorithm 133 can dictate when a measurement is taken by a sensor device 151 and which particular sensor devices 151 take a measurement at that point in time. As another example, a protocol 132 and/or an algorithm 133 can be used, in conjunction with measurements made by one or more sensor devices 151, by the controller 104 to determine how much heated water is in the tank 195 of the water heater 190 and available for immediate use by a user 150.

As yet another example, a protocol 132 and/or an algorithm 133 can be used by the controller 104 to determine, if the amount of heated water currently in the tank 195 is insufficient for a desired use of the user 150, how long it will take for the proper amount of water in the tank 195 to be heated and ready for use. As still another example, a protocol 132 and/or an algorithm 133 can be used by the controller 104 to suspend and/or resume operation of the heating system 170.

Stored data 134 can be any data associated with the water heating system 100 (including any components thereof), any measurements taken by the sensor devices 151, time measured by the timer 110, adjustments to an algorithm 133, threshold values, user preferences, default values, results of previously run or calculated algorithms 133, and/or any other suitable data. Such data can be any type of data, including but not limited to historical data for the water heating system 100 (including any components thereof, such as the sensor devices 151 and the heating system 170), calculations, adjustments made to calculations based on actual data, and measurements taken by one or more sensor devices 151. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the power supply 135, and the water heater 190 (including components thereof) in the water heating system 100. More specifically, the control engine 106 sends information to and/or receives information from the storage repository 130 in order to communicate with the user 150, the power supply 135, and the water heater 190. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., switch 156, a sensor 151, the user 150) in the water heating system 100.

As another example, the control engine 106 can acquire the current time using the timer 110. The timer 110 can enable the controller 104 to control the heating system 170 (including any components thereof). As yet another example, the control engine 106 can direct a sensor 151 to measure a parameter (e.g., temperature, flow rate) and send the measurement by reply to the control engine 106.

Figure 3:
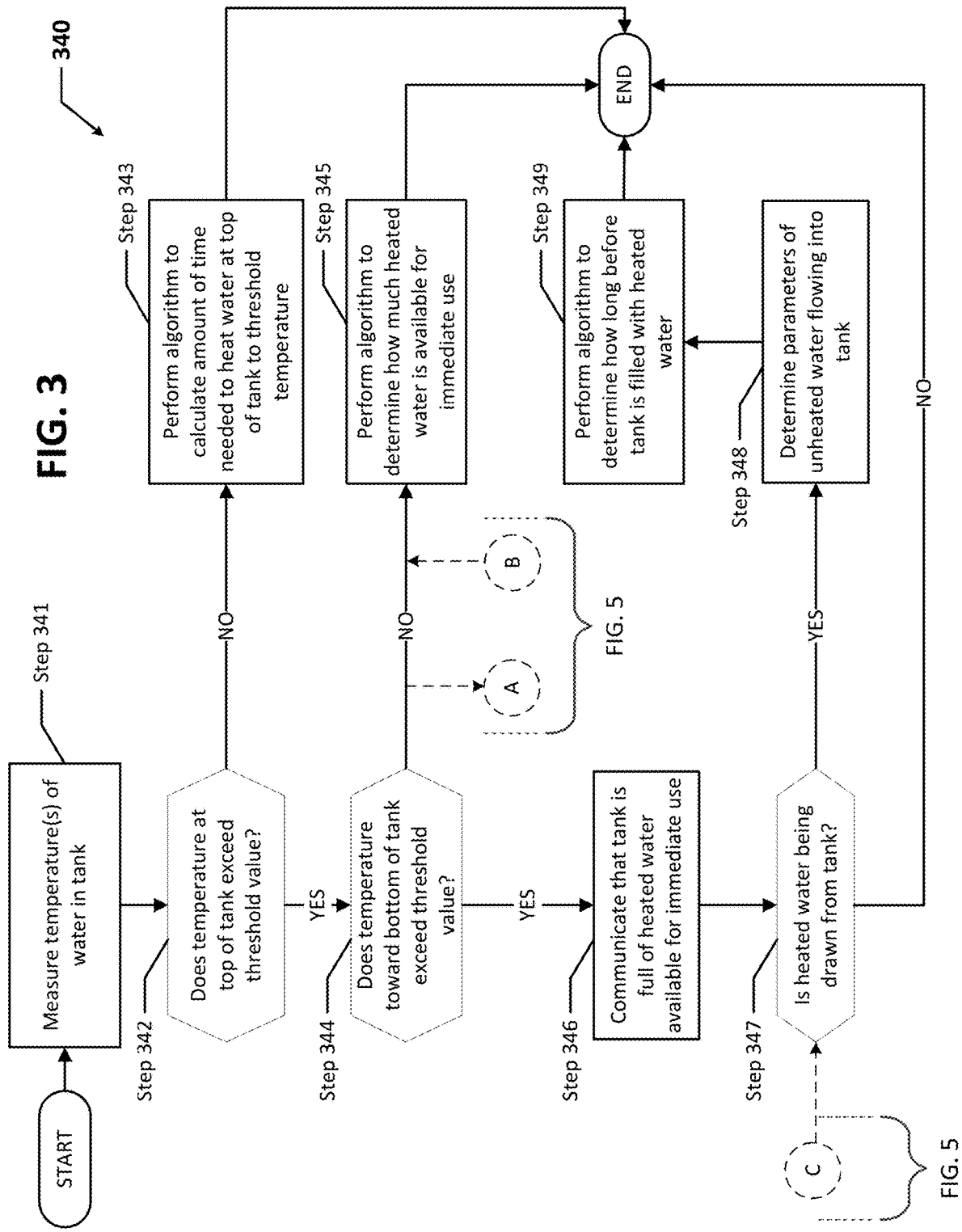
FIGS. 3-6 each show a flowchart for determining hot water supply in water heaters in accordance with certain example embodiments.
Figure 4:
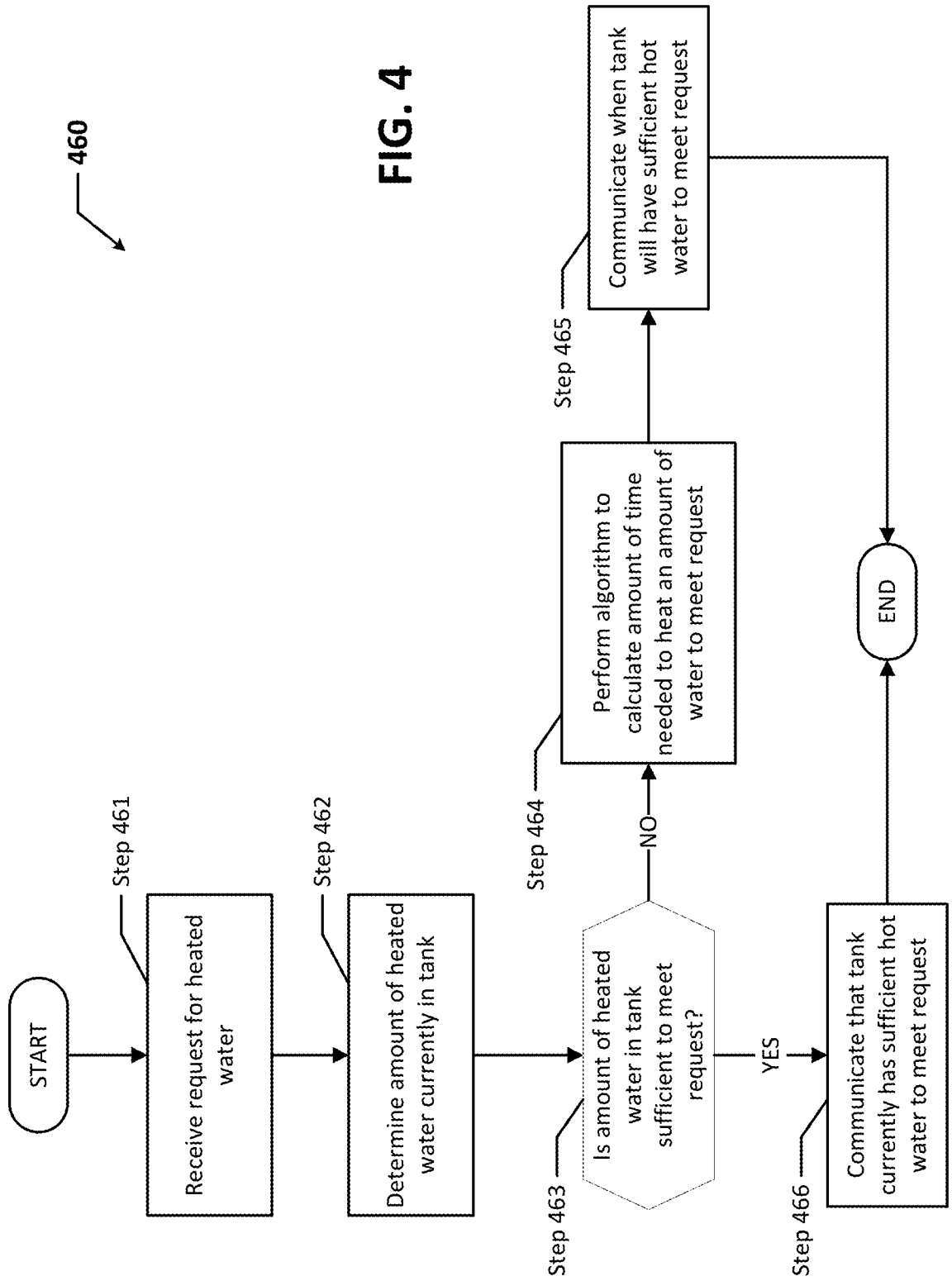
Figure 5:
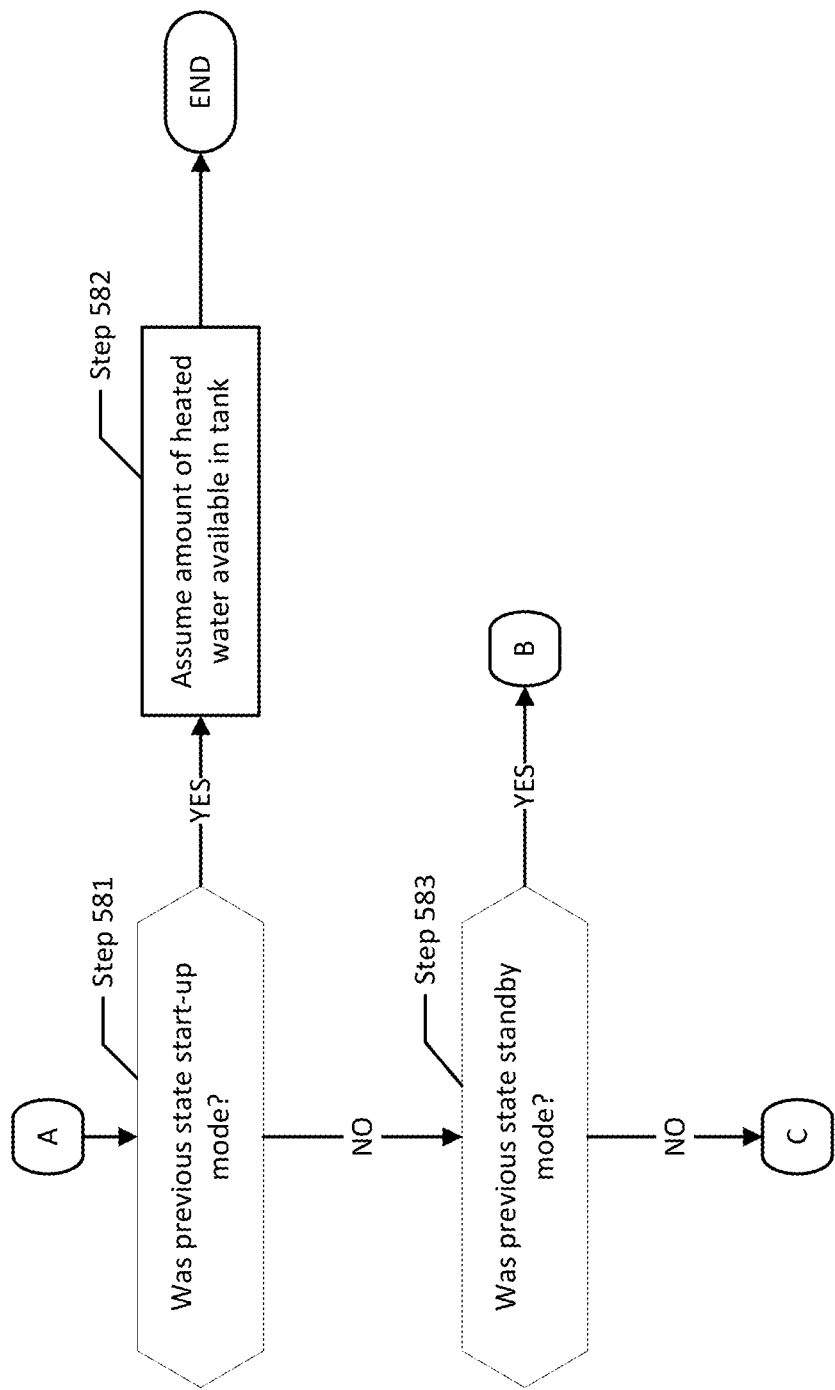

The control engine 106 can be configured to perform a number of functions that help the controller 104 make a determination (an estimate) that relates to the amount of heated water in the tank 195 of the water heater 190 at a particular point in time. For example, the control engine 106 can execute any of the protocols 132 and/or algorithms 133 stored in the storage repository 130 and use the results of those protocols 132 and/or algorithms 133 to communicate to a user 150 an amount of heated water currently available in the tank 195 of the water heater 190. As another example, if there is an insufficient amount of heated water currently available in the tank 195 of the water heater 190, the control engine 106 can execute other protocols 132 and/or algorithms 133 and use the results of those protocols 132 and/or algorithms 133 to communicate to a user 150 how long it will take to achieve some amount of heated water within the tank 195 of the water heater 190. FIGS. 3 and 4 below provide more specific examples of how the control engine 106 functions according to certain example embodiments.

The control engine 106 can generate an alarm or some other form of communication when an operating parameter (e.g., amount of heated water in tank 195 of water heater 190, temperature read by a temperature sensor 158) exceeds or falls below a threshold value (in other words, falls outside an acceptable range of values). The control engine 106 can also track measurements made by a sensor device 151 and determine a possible present or future failure of the sensor device 151 or some other component of the water heater 190 or, more generally, the water heating system 100.

Using one or more algorithms 133, the control engine 106 can predict the expected useful life of these components based on stored data 134, a protocol 132, one or more threshold values, and/or some other factor. The control engine 106 can also measure (using one or more sensors 151) and analyze the efficiency of the water heater 190 over time. An alarm can be generated by the control engine 106 when the efficiency of a component of the water heating system 100 falls below a threshold value, indicating failure of that component.

If the control engine 106 determines there is an insufficient amount of heated water within the tank 195 of the water heater 190, the control engine 106 can control one or more components (e.g., the heating system 170, a valve 152) to get the amount of heated water within the tank 195 of the water heater 190 to within an acceptable range of values (e.g., default values, user-selected values).

The control engine 106 can perform its evaluation functions and resulting actions on a continuous basis, periodically, during certain time intervals, or randomly. Further, the control engine 106 can perform this evaluation for the present time or for a period of time in the future. For example, the control engine 106 can perform forecasts to determine the volume of heated water that will be in the tank 195 of the water heater 190 after a specified period of time. The control engine 106 can adjust a forecast (e.g., every hour, when new information from a user 150 or a sensor device 151 is received).

The control engine 106 can provide power, control, communication, and/or other similar signals to the user 150, the power supply 135, and the water heater 190 (including components thereof). Similarly, the control engine 106 can receive power, control, communication, and/or other similar signals from the user 150, the power supply 135, and the water heater 190. The control engine 106 can control each sensor 151, valve 152, and/or other component in the water heating system 100 automatically (for example, based on one or more algorithms 133 stored in the storage repository 130) and/or based on power, control, communication, and/or other similar signals received from another device through a signal transfer link 105 and/or a power transfer link 185. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a network manager) of a system external to the water heating system 100. For example, the control engine 106 can interact with an inventory management system by ordering a component (e.g., a sensor device 151) to replace a sensor device 151 (e.g., temperature sensor 158-3) that the control engine 106 has determined has failed or is failing. As another example, the control engine 106 can interact with a workforce scheduling system by scheduling a maintenance crew to repair or replace a component of the water heating system 100 when the control engine 106 determines that the component requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., a user 150, a switch 156) of the water heating system 100. For example, if a user 150 operates under IEC Standard 62386, then the user 150 can have a serial communication interface that will transfer data (e.g., stored data 134) measured by the sensors 151. In such a case, the control engine 106 can also include a serial interface to enable communication with the user 150. Such an interface can operate in conjunction with, or independently of, the protocols 132 used to communicate between the controller 104 and the user 150, the power supply 135, and the water heater 190 (or components thereof).

The control engine 106 (or other components of the controller 104) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) the user 150, the power supply 135, and the water heater 190 (or components thereof). In some cases, the communication module 108 accesses the stored data 134 to determine which communication protocol is used to communicate with a sensor 151 associated with certain stored data 134. In addition, the communication module 108 can interpret the communication protocol of a communication received by the controller 104 so that the control engine 106 can interpret the communication.

The communication module 108 can send and receive data between the power supply 135, the water heater 190 (or components thereof), and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The control engine 106 can also facilitate the data transfer between the water heater (or components thereof), the power supply 135, and a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The power module 112 of the controller 104 provides power to one or more other components (e.g., timer 110, control engine 106) of the controller 104. In addition, in certain example embodiments, the power module 112 can provide power to one or more components (e.g., the heating system 170 of the water heater 190, the switch 156, a valve 152) of the water heating system 100. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from the power supply 135 and generates power of a type (e.g., AC, DC) and level (e.g., 12V, 24V, 120V) that can be used by the other components of the controller 104 and/or by the water heater 190. For example, 240 VAC received from the power supply 135 by the power module 112 can be converted to 12 VDC by the power module 112. The power module 112 can use a closed control loop to maintain a preconfigured voltage or current with a tight tolerance at the output. The power module 112 can also protect the remainder of the electronics (e.g., hardware processor 120, transceiver 124) in the controller 104 from surges generated in the line.

In addition, or in the alternative, the power module 112 can be a source of power in itself to provide signals to the other components of the controller 104. For example, the power module 112 can be a battery. As another example, the power module 112 can be a localized photovoltaic power system. In certain example embodiments, the power module 112 of the controller 104 can also provide power and/or control signals, directly or indirectly, to one or more of the sensor devices 151. In such a case, the control engine 106 can direct the power generated by the power module 112 to one or more of the sensor devices 151. In this way, power can be conserved by sending power to the sensor devices 151 when those devices need power, as determined by the control engine 106.

The optional energy metering module 111 of the controller 104 can measure one or more components of power (e.g., current, voltage, resistance, VARs, watts) at one or more points (e.g., output of the power supply 135) associated with the water heating system 100. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. If there is no energy metering module 111, then the controller 104 can estimate one or more components of power using one or more algorithms 133.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by the user 150, the power supply 135, and the water heater 190 (or portions thereof). The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the power supply 135, and the water heater 190 (or portions thereof). The transceiver 124 can use wired and/or wireless technology. The transceiver 124 can be configured in such a way that the control and/or communication signals sent and/or received by the transceiver 124 can be received and/or sent by another transceiver that is part of the user 150, the power supply 135, and the water heater 190 (or portions thereof). The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the power supply 135, and the water heater 190 (or portions thereof) can be part of the stored data 134 (or similar areas) of the storage repository 130.

Optionally, in one or more example embodiments, the security module 128 secures interactions between the controller 104, the user 150, the power supply 135, and the water heater 190 (or portions thereof). More specifically, the security module 128 authenticates communication from software based on security keys verifying the identity of the source of the communication. For example, user software may be associated with a security key enabling the software of the user 150 to interact with the controller 104 and/or the sensors 151. Further, the security module 128 can restrict receipt of information, requests for information, and/or access to information in some example embodiments.

Figure 2:
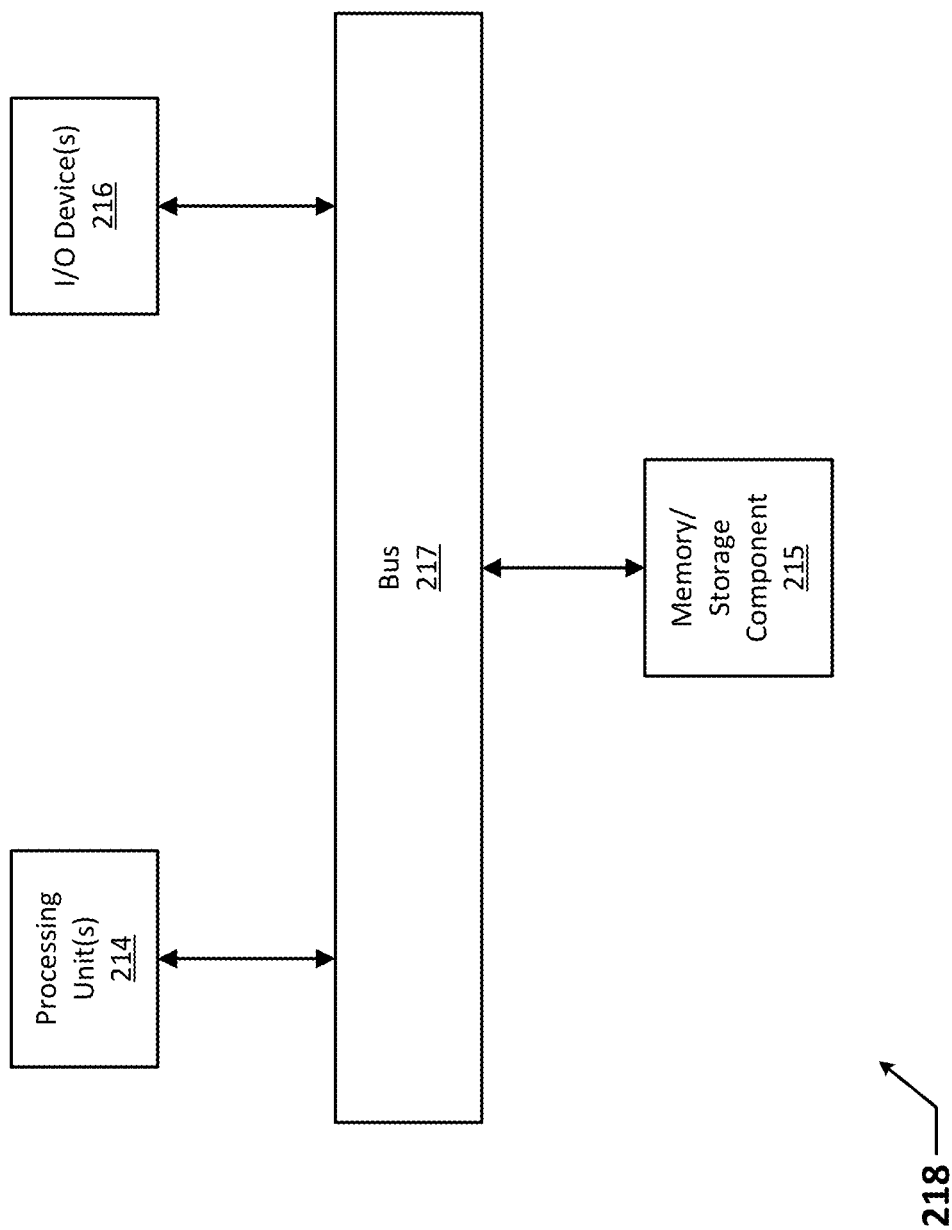
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 can be located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

FIGS. 3-6 each show a flowchart for determining hot water supply in a water heater in accordance with certain example embodiments. While the various steps in these flowcharts are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of managing the amount of heated water within the tank 195 can be a continuous process, and so the START and END steps shown in FIGS. 3-6 can merely denote the start and end of a particular series of steps within a continuous process.

In addition, a person of ordinary skill in the art will appreciate that additional steps not shown in FIGS. 3-6 can be included in performing these methods in certain example embodiments. Accordingly, the specific arrangement of steps should not be construed as limiting the scope. In addition, a particular computing device, as described, for example, in FIG. 2 above, is used to perform one or more of the steps for the methods described below in certain example embodiments. For the methods described below, unless specifically stated otherwise, a description of the controller 104 performing certain functions can be applied to the control engine 106 of the controller 104.

For clarity, the controller 104 described herein can control other aspects of the system 100 while performing the functions described above and in the methods of FIGS. 3-6 below. For example, the controller 104 can control the heating system 170 independently of, or in conjunction with, the functions described herein. In such a case, the heating system 170 can be controlled in one or more of a number of ways. For example, the controller 104 can suspend operation of the heating system 170 until the temperature of the heated water drops below some minimum threshold value (part of the stored data 134), at which point the controller 104 can resume operation of the heating system 170. This cycle can continue until heated water is drawn from the tank 195. As another example, the controller 104 can reduce the level of heat generated by the heating system 170 until heated water is drawn from the tank 195.

Referring to FIGS. 1A-6, the example method 340 of FIG. 3 begins at the START step and proceeds to step 341, where the one or more temperatures of the water in the tank 195 is measured. The one or more temperatures can be measured by one or more sensor devices 151 (e.g., temperature sensor 158-1, temperature sensor 158-2) that measure the temperature of the water within the tank 195. When multiple temperature sensors 158 are used, they can be placed at different locations within the tank 195. For example, one temperature sensor 158 (e.g., temperature sensor 158-1) can measure a temperature of the water toward the top end of the tank 195, and another temperature sensor 158 (e.g., temperature sensor 158-2) can measure a temperature of the water toward the bottom end of the tank 195. A temperature measured by a temperature sensor 158 can be an absolute temperature or a differential temperature (e.g., the difference between the temperature measured by temperature sensor 158-1 and the temperature measured by temperature sensor 158-2). The temperature sensors 158 can measure temperature based on instructions received by the controller 104. Once the temperatures are measured, the temperature sensors 158 can send the measurements to the controller 104.

Once the controller 104 receives the one or more temperature measurements from step 341, the controller 104 evaluates those temperature measurements. For example, when there are two temperature sensors 158, as shown in FIG. 1A, then in step 342 a determination is made as to whether the temperature measurement toward the top end of the tank 195 exceeds a threshold value. The determination can be made by the controller 104 using one or more protocols 132 and/or algorithms 133 stored in the storage repository 130. The threshold value can be part of the stored data 134 of the storage repository 130. The threshold value can be some minimum temperature at which the water toward the top end of the tank 195 can be considered heated water. The threshold value can be a set point. Alternatively, the threshold value can be a set point differential. If the temperature measurement toward the top end of the tank 195 exceeds the threshold value, then the process proceeds to step 344. If the temperature measurement toward the top end of the tank 195 does not exceed the threshold value, then there is no heated water in the tank 195 and the process proceeds to step 343.

In step 343, an algorithm 133 is performed to determine the amount of time needed to heat the water toward the top end of the tank 195 to the threshold temperature. Alternatively, an algorithm 133 can be performed to determine the amount of time needed to heat the water in the entire tank 195 to the threshold temperature. The results of this algorithm 133 can also allow the controller 104 to communicate to the user 150 the amount of heated water available for immediate use. The algorithm 133 can be stored in the storage repository 130. The algorithm 133 is performed by the controller 104. The amount of time that is determined can be based on some amount of water (e.g., 10 gallons, 22 gallons) that fills some volume of space toward the top end of the tank 195. Such an amount of water can be part of the stored data 134, can be part of a corresponding algorithm 133 and/or protocol 132, can be dictated by a user 150, or established in some other way. In certain example embodiments, the controller 104 communicates the results of the algorithm 133 to the user 150.

As discussed below, the water heater 190 can operate in one of a number of modes. Examples of such modes can include, but are not limited to, a start-up mode, a standby mode, a transient mode, and a normal operating mode. The amount of time needed to heat water in the tank 195 can vary, depending, for example, on whether the water heater 190 is in start-up mode (e.g., was just installed, the heating system 170 just resumed operation after an extended period of time where operations were suspended), in a transient mode (e.g., some quantity of heated water was just drawn out of the tank 195), on standby mode, or in some other mode of operation. For example, if the water heater 190 is in start-up mode, the controller 104 can assume that 0% of the capacity of the tank 195 has heated water if the temperatures toward the top and bottom of the tank (measured by temperature sensor 158-1 and temperature sensor 158-2, respectively) do not exceed the threshold temperature. Alternatively, in some cases, measurements taken by one or more of the temperature sensors 158 can be used to determine the amount of heated water in the tank 195 when the water heater begins a new mode of operation. In any such case, the following algorithms 133 (equations) can be used by the controller 104:

(1) Q=mCΔT, where Q is an amount of energy expressed in Joules (J, where 1J=1 W-s), m is the mass of the water in grams and can be converted to gallons (1 gallon=3785.41 grams nominally), C is the specific heat capacity of water (4.18 J/g° C. nominally), and ΔT is the difference between the temperature threshold value (the minimum temperature at which the water can be considered heated water) and the initial temperature of the water in the tank 195 and is in Celsius (ΔT [° C.]=5/9×(ΔT[° F.]).

(2) Time=mCΔT÷element wattage, where element wattage is the amount of heat energy per second given off by the heating system 170 into the tank 195, where the actual hot water capacity of the tank 195 is converted to grams, and where ΔT is in Celsius (ΔT [° C.]=5/9×(ΔT[° F.]).

Alternatively, if the water heater 190 is in a transient state, the controller 104 can use measurements from the flow sensor 154 and the timer 110 to determine the amount of unheated water added via the inlet pipe 107. With this information, in conjunction with algorithm (2) above, the controller 104 can determine the amount of time it will take to have all of the water in the tank 195 be considered heated water (exceed the minimum threshold value). In some cases, the controller 104 communicates (e.g., via a mobile app, text/emails) to the user 150 that there is no heated water currently in the tank. Once step 343 is complete, the method 340 can revert to one of the previously-described steps (e.g., step 341). Alternatively, when step 343 is complete, then the method 340 can end at the END step.

In step 344, a determination is made as to whether the temperature measurement toward the bottom end of the tank 195 exceeds a threshold value. The determination can be made by the controller 104 using one or more protocols 132 and/or algorithms 133 stored in the storage repository 130. The threshold value can be part of the stored data 134 of the storage repository 130. The threshold value can be some minimum temperature at which the water toward the bottom end of the tank 195 can be considered heated water. If the temperature measurement toward the bottom end of the tank 195 exceeds the threshold value, then the process proceeds to step 346. The threshold value corresponding to upper temperature sensor 158-1 (e.g., toward the top end of the tank 195) and the threshold value corresponding to the lower temperature sensor 158-2 (e.g., toward the bottom end of the tank 195) may or may not be the same value. If the temperature measurement toward the bottom end of the tank 195 does not exceed the threshold value, then the process proceeds to step 345. In certain optional embodiments, when the water heater 190 has different modes of operation (e.g., standby, start-up), the process can proceed to step 581 of FIG. 5 below.

In step 345, an algorithm 133 is performed to determine how much heated water in the tank 195 is available for immediate use. Additionally, the results of this algorithm 133 can allow the controller 104 to communicate with the user 150 as to the amount of time it will take until the entire tank 195 has heated water. The algorithm 133 can be stored in the storage repository 130. The algorithm 133 is performed by the controller 104. The amount of heated water currently available in the tank 195 can be based, at least in part, on the temperatures (part of stored data 134) measured by the temperature sensors 158 in step 341. In certain example embodiments, the controller 104 communicates the results of the algorithm 133 to the user 150. For example, the controller 104 can communicate (e.g., via a mobile app, text/emails) to the user 150 the amount of time it will take until all of the water in the tank is heated water. Once step 345 is complete, the method 340 can revert to one of the previously-described steps (e.g., step 341). Alternatively, when step 345 is complete, then the method 340 can end at the END step.

In step 346, a communication can be dispatched to state that the tank 195 is full of heated water that is available for immediate use. The controller 104 can perform the communication, which can be sent to a user 150. The controller 104 can also communicate the amount of heated water that is currently available. In such a case, the amount is equal to the actual capacity of the tank 195 of the water heater 190.

In step 347, a determination is made as to whether heated water is being drawn from the tank 195. Such a determination can be made by the controller 104 using, for example, measurements made by a flow sensor 154 (a type of sensor device 151) with respect to the amount of unheated water flowing into the tank 195 in a period of time (measured by the timer 110). If heated water is being drawn from the tank 195, then the process proceeds to step 348. If heated water is not being drawn from the tank 195, then the method 340 can end at the END step. Alternatively, the method 340 can revert to one of the previously-described steps (e.g., step 341).

In step 348, one or more parameters of the unheated water flowing into the tank 195 are determined. Such parameters can include, but are not limited to, an amount of unheated water and a temperature of the unheated water. A parameter can be measured using a sensor device 151. For example, if the parameter is an amount of unheated water flowing into the tank 195, then the flow sensor 154-1 can be used to make such a measurement. As another example, if the parameter is a temperature of the unheated water flowing into the tank 195, then the temperature sensor 158-3 can be used to make such a measurement. Any measurements made by a sensor device 151 (e.g., flow sensor 154-1, temperature sensor 1583) can be based on instructions received by the sensor device 151 from the controller 104. Once the one or more parameters are measured, the corresponding sensor device 151 can send the measurements to the controller 104.

If the tank 195 is full of heated water, and the heated water is drawn from the tank 195, at the end of draw, the controller 104 knows (based on the measurement of the flow sensor 154-1 and/or the flow sensor 154-2, along with the time measured by the timer 110) how much unheated water was introduced in the tank 195 through the inlet line 107 and/or how much heater water was drawn from the tank 195 through the outlet line 109. The controller 104 can then subtract that amount from the rated capacity of the tank 195 of the water heater 190. For example, if the total amount of heated water drawn from the tank 195 is 10 gallons, and if the capacity of the tank 195 is 37.5 gallons, then the amount of heated water that remained in the tank 195 after the draw is 37.5−10=27.5 gallons or 73.33% of the capacity of the tank 195.

In step 349, an algorithm 133 is performed to determine how long it will take until the tank 195 is again filled with heated water. The results of this algorithm 133 can also allow the controller 104 communicate to the user 150 the amount of heated water available for immediate use. The algorithm 133 can be stored in the storage repository 130. The algorithm 133 is performed by the controller 104. The determination can be based, at least in part, on the temperature (part of stored data 134) measured by the temperature sensor 158-3 and/or the amount of unheated water introduced to the tank 195 (based on the flow rate measured by a flow sensor 154 in step 341 and the period of time measured by the timer 110).

In certain example embodiments, the controller 104 communicates the results of the algorithm 133 to the user 150. In some cases, the controller 104 can continuously determine how much heated water is in the tank 195 at a given time, and this information can be communicated to a user 150. For example, the controller 104 can communicate (e.g., via a mobile app, text/emails) to the user 150 the amount of heated water that is currently available in the tank. Once step 349 is complete, the method 340 can revert to one of the previously-described steps (e.g., step 341). Alternatively, when step 349 is complete, then the method 340 can end at the END step.

The method 460 of FIG. 4 describes how example embodiments can provide a time estimate to meet a volume request for heated water from a water heater 190 The example method 460 of FIG. 4 begins at the START step and proceeds to step 461, where a request for heated water is received. The request can be made by a user 150 to the controller 104. The request can be a direct request (e.g., a request made through a mobile app for a specific amount of heated water) from a user 150. If the user 150 is an appliance or process that uses heated water, then the user 150 can also communicate requests directly to the controller 104. For example, if a faucet (a form of a user 150) for a showerhead is turned on, the controller can determine, based on historical usage, how much heated water should be required. As another example, if a dishwasher (another form of a user 150) is about to operate, the controller 104 can determine, based on the setting selected, manufacturer's data, and/or historical usage, how much heated water should be required. As yet another example, if a clothes washer (yet another form of a user 150) is about to operate, the controller 104 can determine, based on the setting selected, manufacturer's data, and/or historical usage, how much heated water should be required.

When a user 150 is an appliance or other process that uses heated water, then such appliance, process, or associated component can be configured to wired and/or wirelessly communicate with the controller 104. In any case, the controller 104 can communicate with any type of user 150 (e.g., appliances, smart phones) and be able to estimate, based on stored data 134 (e.g., manufacturer's settings, historical usage), how much water is required for the various processes. The request can be received by the controller 104 using the application interface 126.

In step 462, the amount of heated water (i.e., water that exceeds a minimum temperature threshold value) currently in the tank 195 is determined. This determination can be made by the controller 104 using one or more algorithms 133 and/or protocols 132. The determination can also be made by the controller 104 using one or more measurements of one or more parameters (e.g., temperatures) made by one or more sensor devices 151 (e.g., temperature sensor 158-1, temperature sensor 158-2). Any measurements made by a sensor device 151 can be based on instructions received by the sensor device 151 from the controller 104. Once the one or more parameters are measured, the corresponding sensor device 151 can send the measurements to the controller 104.

In step 463, a determination is made as to whether the amount of heated water in the tank 195 is sufficient to meet the request of step 461. The determination can be made by the controller 104 by comparing the amount requested in step 461 with the amount calculated in step 462. If the amount of heated water in the tank 195 is sufficient to meet the request, then the process proceeds to step 466. If the amount of heated water in the tank 195 is not sufficient to meet the request, then the process proceeds to step 464.

In step 464, an algorithm 133 is performed to determine how long it will take until the tank 195 has the amount of heated water needed to meet the request. The algorithm 133 can be stored in the storage repository 130. The algorithm 133 is performed by the controller 104. The determination can be based, at least in part, on the temperature (part of stored data 134) measured by the temperature sensors 158-1 and 158-2. In step 465, a communication is sent as to when the tank 195 will have sufficient heated water to meet the request. The controller 104 can generate and send the communication to a user 150. Once step 465 is complete, the method 460 can revert to one of the previously-described steps (e.g., step 461). Alternatively, when step 465 is complete, then the method 460 can end at the END step.

In step 466, a communication is sent that the tank 195 currently has sufficient heated water to meet the request. The controller 104 can generate and send the communication to a user 150. Once step 466 is complete, the method 460 can revert to one of the previously-described steps (e.g., step 461). Alternatively, when step 466 is complete, then the method 460 can end at the END step.

As discussed above, in some cases, a water heater 190 can operate in one of a number of different modes. Such modes of operation can include, but are not limited to, stand-by mode, startup mode, and normal operating mode. For such water heaters 190, additional steps in the method 340 of FIG. 3 can be included. Such additional steps are shown with respect to the method 580 of FIG. 5. The example method 580 of FIG. 5 begins as a continuation of step 344 of FIG. 3, where the temperature toward the bottom end of the tank 195 does not exceed a threshold value. In other words, the method 580 of FIG. 5 can apply when the top end of the tank 195 has heated water and the bottom end of the tank 195 does not have heated water.

If the temperature toward the bottom end of the tank 195 does not exceed a threshold value, then the process can proceed to step 581, where a determination is made as to whether the previous state of the water heater 190 was start-up mode. The determination can be made by the controller 104 based on one or more of a number of considerations (e.g., lapse of time with no heat water drawn from the tank 195, extended amount of time that operation of the heating system has been suspended, express instructions from a user 150). If the previous state of the water heater 190 was start-up mode, then the process proceeds to step 582. If the previous state of the water heater 190 was not start-up mode, then the process proceeds to step 583.

In step 582, an amount of heated water that is available in the tank 195 is assumed. The amount that is assumed can be done by the controller 104. The assumed amount of heated water in the tank 195 can be a default value (e.g., 40%). Alternatively, the assumed amount of heated water in the tank 195 can be based on historical values. As yet another example, the assumed amount can be based on an algorithm 133 combined with one or more temperature measurements made by one or more temperature sensors 158. Once step 582 is complete, the method 580 can revert to one of the previously-described steps (e.g., step 342 of FIG. 3). Alternatively, when step 582 is complete, then the method 580 can end at the END step. Rather than the process ending, if the step following step 582 is step 349 of FIG. 3, then the controller 104 can use algorithm 2 above to determine how long before the tank 195 is filled with heated water.

In step 583, a determination is made as to whether the previous state of the water heater 190 was standby mode. The determination can be made by the controller 104 based on one or more of a number of considerations (e.g., lapse of time with no hot water drawn from the tank 195, amount of time that operation of the heating system has been suspended, express instructions from a user 150). If the previous state of the water heater 190 was standby mode, then the process reverts to step 345 of FIG. 3. If the previous state of the water heater 190 was not standby mode, then the process reverts to step 347 of FIG. 3.

In standby mode, a tank (e.g., tank 195) can lose approximately 6 gallons (for 30, 40 and 50 gallons tanks) before a temperature sensor has a temperature reading that falls below a threshold value. For a 50 gallon tank, 6 gallons of loss represents approximately 16% of the capacity of the tank. In such a case, the tank 195 would have approximately 84% of its capacity filled with heated water.

Figure 6:
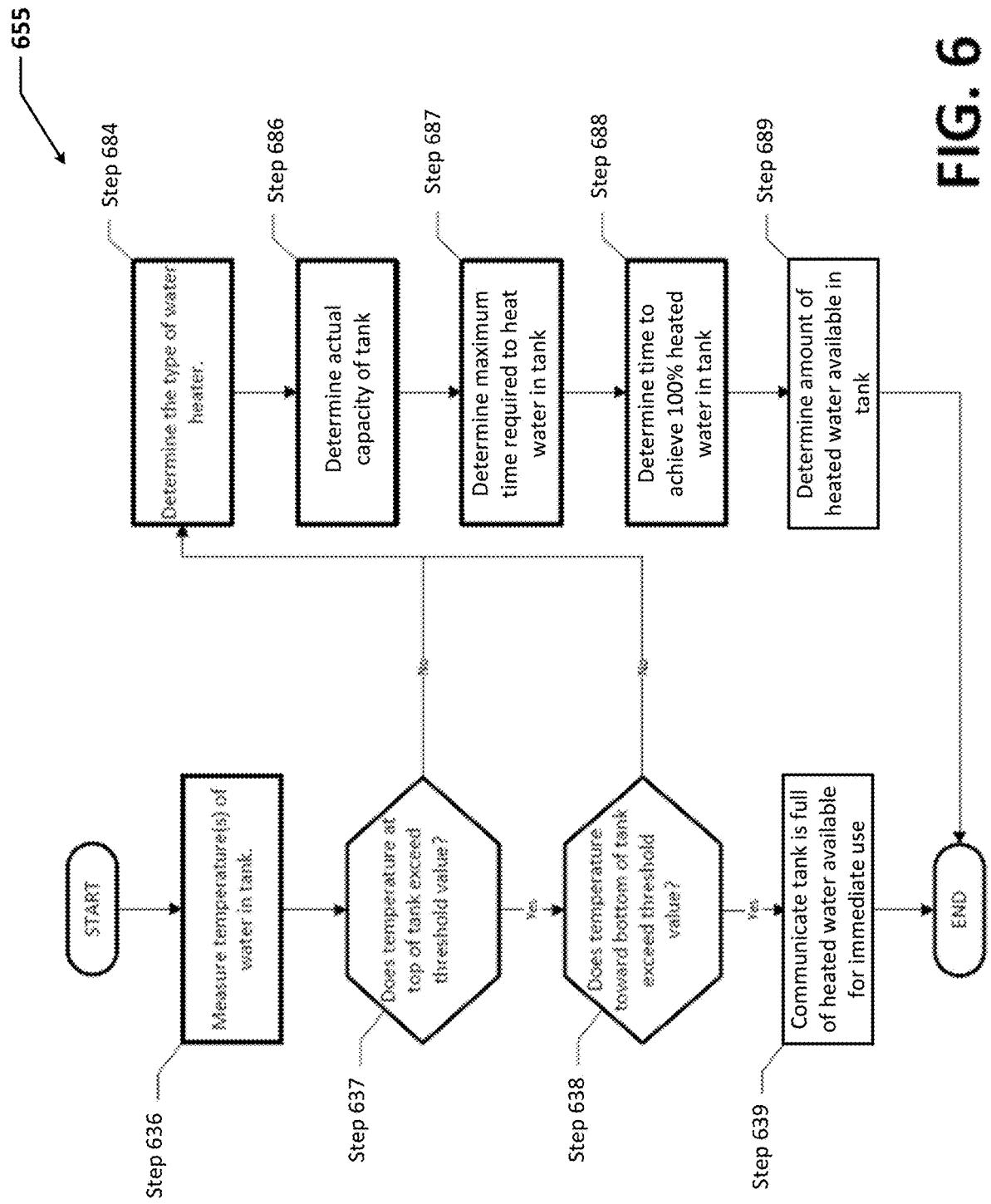

Another method of determining hot water supply in storage type water heaters is illustrated by the method 655 set forth in FIG. 6. The example method 655 of FIG. 6 begins at step 636, where the one or more temperatures of the water in the tank 195 is measured. The one or more temperatures can be measured by one or more sensor devices 151 (e.g., temperature sensor 158-1, temperature sensor 158-2, temperature sensor 158-3) that measure the temperature of the water within the tank 195. When multiple temperature sensors 158 are used, they can be placed at different locations within the tank 195. For example, one temperature sensor 158 (e.g., temperature sensor 158-1) can measure a temperature of the water toward the top end of the tank 195, and another temperature sensor 158 (e.g., temperature sensor 158-2) can measure a temperature of the water toward the bottom end of the tank 195. A temperature measured by a temperature sensor 158 can be an absolute temperature or a differential temperature (e.g., the difference between the temperature measured by temperature sensor 158-1 and the temperature measured by temperature sensor 158-2). The temperature sensors 158 can measure temperature based on instructions received by the controller 104. Once the temperatures are measured, the temperature sensors 158 can send the measurements to the controller 104.

Once the controller 104 receives the one or more temperature measurements from step 341, the controller 104 evaluates those temperature measurements. For example, when there are two temperature sensors 158, then in step 637 a determination is made as to whether the temperature measurement toward the top end of the tank 195 exceeds a threshold value. The determination can be made by the controller 104 using one or more protocols 132 and/or algorithms 133 stored in the storage repository 130. The threshold value can be part of the stored data 134 of the storage repository 130. The threshold value can be some minimum temperature at which the water toward the top end of the tank 195 can be considered heated water. The threshold value can be a set point. Alternatively, the threshold value can be a set point differential. If the temperature measurement toward the top end of the tank 195 exceeds the threshold value, then the process proceeds to step 638. If the temperature measurement toward the top end of the tank 195 does not exceed the threshold value, then there is no heated water in the tank 195 and the process proceeds to step 684.

In step 638, a determination is made as to whether the temperature measurement toward the bottom end of the tank 195 exceeds a threshold value. The determination can be made by the controller 104 using one or more protocols 132 and/or algorithms 133 stored in the storage repository 130. The threshold value can be part of the stored data 134 of the storage repository 130. The threshold value can be some minimum temperature at which the water toward the bottom end of the tank 195 can be considered heated water. The threshold value corresponding to upper temperature sensor 158-1 (e.g., toward the top end of the tank 195) and the threshold value corresponding to the lower temperature sensor 158-2 (e.g., toward the bottom end of the tank 195) may or may not be the same value. If the temperature measurement toward the bottom end of the tank 195 exceeds the threshold value, then the process proceeds to step 639. If the temperature measurement toward the bottom end of the tank 195 does not exceed the threshold value, then the process proceeds to step 684.

In step 639, a communication can be dispatched to state that the tank 195 is full of heated water that is available for immediate use. The controller 104 can perform the communication, which can be sent to a user 150. The controller 104 can also communicate the amount of heated water that is currently available. In such a case, the amount is equal to the capacity of the tank 195 of the water heater 190. Once step 639 is complete, the method 655 can revert to one of the previously-described steps in this or another method. Alternatively, when step 639 is complete, then the method 655 can end at the END step.

In step 684, the type of water heater 190 is determined. Such a determination can be made by the controller 104. The type of water heater 190 can refer to the type of heating system 170 (e.g., electric, natural gas, propane). In addition, or in the alternative, the type of water heater 190 can refer to some other characteristic of the water heater 190. In any case, the type of water heater 190 has associated with it certain characteristics and values (e.g., heating curves, capacities, flow rates). Such information can be stored data 134 in the storage repository 130.

In step 686, the actual capacity of the tank 195 is determined. As defined above, the actual capacity of the tank 195 is the amount of water (e.g., heated water, unheated water) that the tank 195 can hold at a given point in time. The actual capacity of the tank 195 is less than or equal to the nameplate capacity of the tank 195. The actual capacity of the tank 195 can be determined by the controller 104. The actual capacity of the tank 195 can be stored data 134 in the storage repository 130.

In step 687, the maximum time to have the tank 195 full of heated water is determined. The maximum time would be required when the entire tank 195 is at the inlet water temperature (i.e., the temperature of the unheated water), as measured by temperature sensor 158-3. The controller 104 can use one or more algorithms 133 (e.g., algorithm (1) and/or (2) above) to determine the amount of time that it takes to heat all of the water in the tank 195 to heated water.

In step 688, if the tank 195 has some amount (e.g., 25%, 54%) of heated water, the amount of time that it takes to heat the remainder of the water in the tank 195 to heated water (i.e., to have 100% heated water in the tank 195) can be determined. For example, as discussed above, if the water heater 190 is in standby mode, then anywhere between 0% and 100% of the capacity of the tank 195 can have heated water. The controller 104 can use one or more algorithms 133 (e.g., algorithm (1) and/or (2) above) to determine the amount of time that it takes to heat the remainder of the water in the tank 195 to heated water.

In step 689, the amount of heated water (i.e., water that exceeds a minimum temperature threshold value) available in the tank 195 can be determined. This determination can be made by the controller 104 using one or more algorithms 133 and/or protocols 132. The determination can also be made by the controller 104 using one or more measurements of one or more parameters (e.g., temperatures) made by one or more sensor devices 151 (e.g., temperature sensor 158-1, temperature sensor 158-2). Any measurements made by a sensor device 151 can be based on instructions received by the sensor device 151 from the controller 104. Once the one or more parameters are measured, the corresponding sensor device 151 can send the measurements to the controller 104.

As stated above, the amount of time it takes to heat an amount (e.g., 5 gallons, the entire tank 195) of water in the tank 195 of the water heater 190 can be calculated using one or more of a number of algorithms 133. For example, the maximum amount of time needed to heat the contents of an entire tank 195 to a threshold temperature for heated water based on the temperature of unheated water entering the tank 195 through the inlet line 107 can be determined using the following algorithm 133:

(3) Time=[capacity×8790.56×(SP−T)]P, where capacity is the actual capacity of the tank 195 (e.g., from step 686), SP is the temperature set point (also called the temperature threshold value above which the water in the tank 195 is considered heated water), T is the temperature (e.g., measured by temperature sensor 158-3) of the unheated water introduced through the tank 195 through the inlet line 107 or the dip tube 103, and P is the power draw of the heating system 170 or portion thereof (e.g., heating element 171-1, heating element 171-2). For example, this can be part of the determination of step 687 above.

As another example, the amount of time needed to heat an entire tank 195 can be determined using the following algorithm 133:

(4) Time=[(2930.19×Capacity×((SP-4)−$T_u$)+(5860.38× Capacity×((SP-4)−$T_L$)+P, where capacity is the actual capacity of the tank 195, SP is the temperature set point (also called the temperature threshold value above which the water in the tank 195 is considered heated water), Tu is the temperature read by temperature sensor 158-1, $T_L$ is the temperature read by temperature sensor 158-2, and P is the power draw of the heating system 170 or portion thereof (e.g., the heating element 171-1). For example, this can be part of the determination of step 688 above.

In some cases, these two preceding algorithms 133 can be used in conjunction with each other. For example, the amount of hot water available in a tank 195 can be determined by the following algorithm 133:

(5) Hot water availability=[(results of (3)−results of (4))+ results of (3)]×100%. This calculation can be performed, for example, in step 689 above. Once step 689 is complete, the method 655 can revert to one of the previously-described steps in this or another method. Alternatively, when step 689 is complete, then the method 655 can end at the END step.

Figure 7:
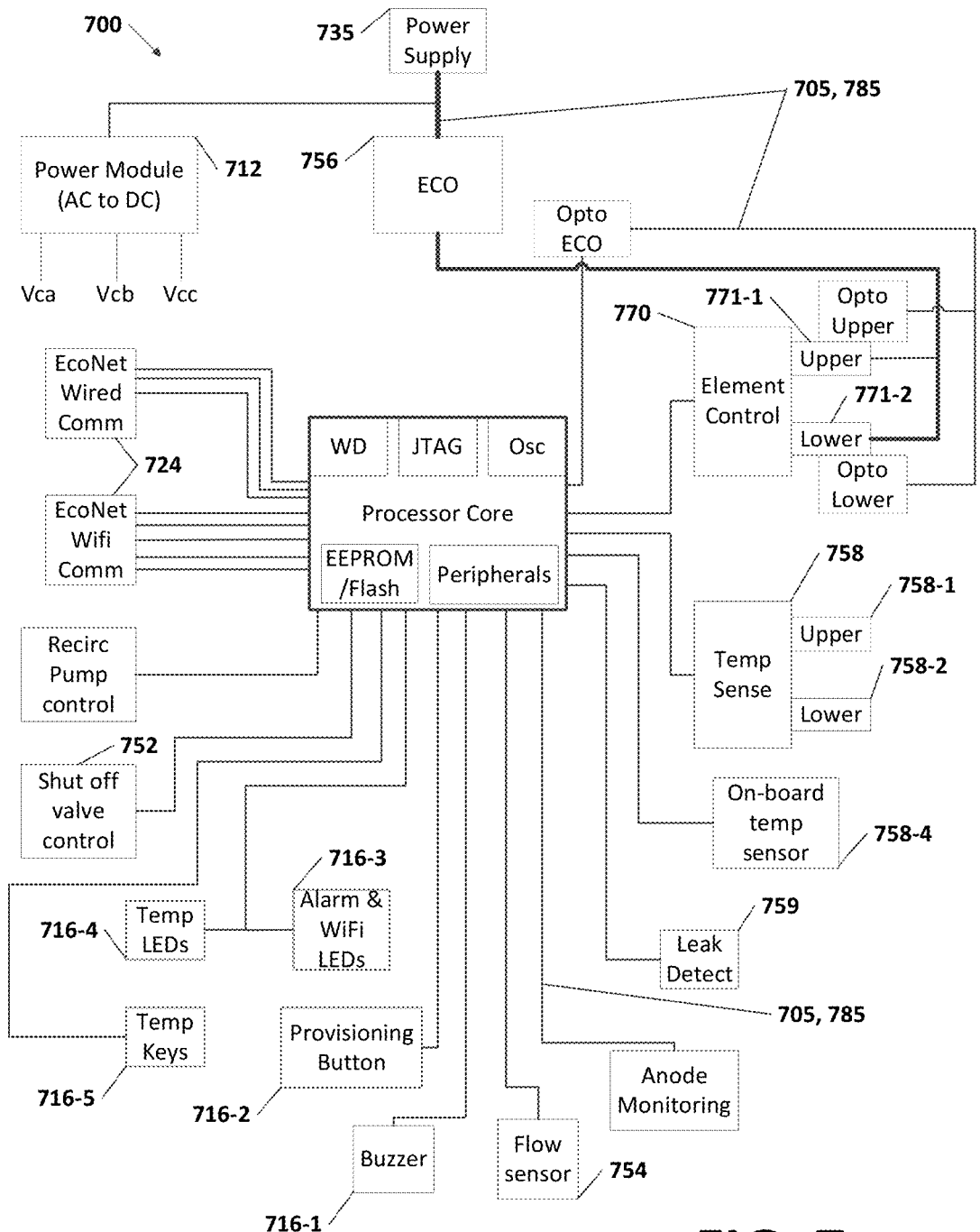
FIG. 7 shows a diagram of a particular system in accordance with certain example embodiments.

FIG. 7 shows a diagram of a particular system 700 in accordance with certain example embodiments. Referring to FIGS. 1A-7, the system 700 of FIG. 7 includes a power supply 735 that provides 240 VAC power to the power module 712 and the heating elements 771 (in this case, heating element 771-1 and heating element 771-2) of the heating system 770. The power module 712 provides power to various components of the controller (e.g., the control engine 706, the transceiver 724) and/or one or more components of the system 700 (e.g., the temperature sensors 758 (in this case, temperature sensor 758-1, temperature sensor 758-2, and temperature sensor 758-3), the water leak sensor 759, the flow sensor 754, the I/O devices 716 (e.g., the buzzer, the provisioning button, the alarm and WiFi LEDs, the temperature LEDs, and the temperature keys), the valve 752). The switch 756 is disposed between the power supply 735 and the heating system 770.

Example embodiments can determine the supply of hot water (also called heated water herein) in a water heater. This determination can be performed in real time for a current amount or a future amount. In the case of determining a future amount, an amount of time may also be estimated using example embodiments. Example embodiments can receive input and/or information from any of a number of sensor devices and/or users to make its determinations. Example embodiments can also provide a determination as to whether there is sufficient heated water for a process that is about to be used by a user. Example embodiments can control various aspects of a water heater to optimize energy efficiency and reduce energy consumption. Example embodiments can also lower costs and increase the useful life of a water heater, including its various components.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:
1. A water heating system comprising:
a water heater comprising a tank;
a first temperature sensor configured to detect a current temperature of water at a first portion of the tank;
a second temperature sensor configured to detect a current temperature of water at a second portion of the tank, the second portion being different from the first portion; and
a controller configured to:
receive temperature data from the first and second temperature sensors;

determine, based at least in part on the temperature data, whether a temperature of water at an upper location of the tank exceeds a first temperature threshold;

in response to determining that the temperature of water at the upper location of the tank does not exceed the first temperature threshold, determine a heating time required to heat the water in the tank to the first temperature threshold;

in response to determining that the temperature of water at the upper location of the tank exceeds the first temperature threshold, determine, based at least in part on the temperature data, whether a temperature of water at a lower location of the tank exceeds a second temperature threshold;

in response to determining that the temperature of water at the lower location of the tank does not exceed the second temperature threshold, determine, based at least in part on the temperature data, an amount of heated water currently available in the tank; and in response to determining that the temperature of water at the lower location of the tank exceeds the second temperature threshold, communicate that the tank currently holds an actual capacity of heated water.

2. The system of claim 1, wherein the controller is further configured to:
determine a location of the heated water in the tank.

3. The system of claim 1 further comprising a flow rate sensor configured to measure a flow rate associated with a draw of heated water.

4. The system of claim 3, wherein the controller is further configured to:
receive flow data from the flow rate sensor; and
determine whether the amount of heated water currently available in the tank is sufficient to satisfy the draw of heated water.

5. The system of claim 1, wherein the controller is further configured to:
receive a request for a requested amount of heated water;
in response to determining that a current amount of heated water currently available in the tank is not sufficient to satisfy the requested amount of heated water, determine an amount of time required to satisfy the requested amount of heated water based at least in part on an actual capacity of the tank, a temperature of incoming unheated water, a set point of heated water, and a heat output of the water heater.

6. The system of claim 5, wherein the controller is further configured to:
output a message to a user device, the message being indicative of the amount of time required to satisfy the requested amount of heated water.

7. The system of claim 1, wherein the controller is further configured to:
output instructions for deactivating a heating device of the water heater in response to determining a temperature of water in the tank exceeds a maximum threshold value.

8. The system of claim 1, wherein the controller is further configured to:
output an error message in response to determining a temperature of water proximate the first temperature sensor is greater than a temperature of water proximate the second temperature sensor, the first temperature sensor being located nearer a top end of the tank than the second temperature sensor.

9. The system of claim 3, wherein the controller is further configured to:
receive flow data from the flow rate sensor; and
determine, based at least in part on the flow data, a subsequent heating time required to heat incoming water to a minimum temperature threshold such that the tank will hold the actual capacity of heated water.

10. The system of claim 1, wherein the controller is further configured to:
in response to determining that the temperature of water at the lower location of the tank does not exceed the second temperature threshold, determine whether an immediately previous state of the water heater was a start-up mode; and
in response to determining that the immediately previous state of the water heater was the start-up mode, determine that the amount of heated water currently available in the tank is equal to an assumed heated water amount.

11. A controller comprising:
one or more processors; and
memory having instructions stored thereon that, when executed by the one or more processors, cause the controller to:
receive temperature data from a first temperature sensor configured to detect a current temperature of water at a first portion of a tank of a water heater and from a second temperature sensor configured to detect a current temperature of water at a second portion of the tank, the second portion being different from the first portion;
determine, based at least in part on the temperature data, whether a temperature of water at an upper location of the tank exceeds a first temperature threshold;
in response to determining that the temperature of water at the upper location of the tank does not exceed the first temperature threshold, determine a heating time required to heat the water in the tank to the first temperature threshold;
in response to determining that the temperature of water at the upper location of the tank exceeds the first temperature threshold, determine, based at least in part on the temperature data, whether a temperature of water at a lower location of the tank exceeds a second temperature threshold;
in response to determining that the temperature of water at the lower location of the tank does not exceed the second temperature threshold, determine, based at least in part on the temperature data, an amount of heated water currently available in the tank; and
in response to determining that the temperature of water at the lower location of the tank exceeds the second temperature threshold, communicate that the tank currently holds an actual capacity of heated water.

12. The controller of claim 11, wherein the instructions, when executed by the one or more processors, further cause the controller to:
determine a location of the heated water in the tank.

13. The controller of claim 11, wherein the instructions, when executed by the one or more processors, further cause the controller to:

receive flow data from a flow rate sensor configured to measure a flow rate associated with a draw of heated water; and determine whether the amount of heated water currently available in the tank is sufficient to satisfy the draw of heated water.

14. The controller of claim 13, wherein the instructions, when executed by the one or more processors, further cause the controller to:

in response to determining that the amount of heated water currently available in the tank is not sufficient to satisfy the draw of heated water, determine an amount of time required for the water heater to produce an amount of heated water sufficient to satisfy the draw of heated water.

15. The controller of claim 14, wherein determining the amount of time required for the water heater to produce the amount of heated water sufficient to satisfy the draw of heated water is based at least in part on an actual capacity of the tank, a temperature of incoming unheated water, a set point of heated water, and a heat output of the water heater.

16. The controller of claim 14, wherein the instructions, when executed by the one or more processors, further cause the controller to:

output a message to a user device, the message being indicative of the amount of time required for the water heater to produce the amount of heated water sufficient to satisfy the draw of heated water.

17. The controller of claim 11, wherein the instructions, when executed by the one or more processors, further cause the controller to:

output instructions for deactivating a heating device of the water heater in response to determining a temperature of water in the tank exceeds a maximum threshold value.

18. The controller of claim 11, wherein the instructions, when executed by the one or more processors, further cause the controller to:

output an error message in response to determining a temperature of water proximate the first temperature sensor is greater than a temperature of water proximate the second temperature sensor, the first temperature sensor being located nearer a top end of the tank than the second temperature sensor.

19. The system of claim 10, wherein the controller is further configured to:

in response to determining that the immediately previous state of the water heater was not the start-up mode, determine whether the immediately previous state of the water heater was a standby mode; and in response to determining that (i) the immediately previous state of the water heater was the standby mode and (ii) the temperature of water at the lower location of the tank does not exceed the second temperature threshold, determine, based at least in part on the temperature data, an amount of heated water currently available in the tank.

20. The system of claim 19, wherein the controller is further configured to:

receive flow data from a flow rate sensor configured to measure a flow rate associated with a draw of heated water; and in response to determining that the immediately previous state of the water heater was not the standby mode, determine, based at least in part on the flow data, a subsequent heating time required to heat incoming water to a temperature that exceeds a minimum temperature threshold such that the tank will hold the actual capacity of heated water.

\* \* \* \* \*